United States Patent
Alexandre et al.

(10) Patent No.: US 6,465,543 B1
(45) Date of Patent: Oct. 15, 2002

(54) POLYOLEFIN NANOCOMPOSITES

(75) Inventors: Michael Alexandre, Ougrée; Philippe G. Dubois, Ciplet; Robert J. E. G. Jerome, Sart-Jalhay; Miguel Garcia-Marti, Blankenberge, all of (BE); Tao Sun, Midland, MI (US); Juan M. Garces, Midland, MI (US); Dean M. Millar, Midland, MI (US); Alexander Kuperman, Midland, MI (US)

(73) Assignee: The Dow Chemical Company, Midland, MI (US)

( * ) Notice: Subject to any disclaimer, the term of this patent is extended or adjusted under 35 U.S.C. 154(b) by 0 days.

(21) Appl. No.: 09/623,940

(22) PCT Filed: Mar. 16, 1999

(86) PCT No.: PCT/US99/05580

§ 371 (c)(1),
(2), (4) Date: Dec. 21, 2000

(87) PCT Pub. No.: WO99/47598

PCT Pub. Date: Sep. 23, 1999

Related U.S. Application Data

(60) Provisional application No. 60/078,085, filed on Mar. 16, 1998, now abandoned.

(51) Int. Cl.[7] ................................................. C08K 3/34
(52) U.S. Cl. ........................ 523/213; 524/445; 524/447; 524/449; 524/450; 526/128; 526/130; 526/156; 526/160; 526/902

(58) Field of Search .......................... 523/213; 524/445, 524/446, 447, 449, 450; 526/129, 130, 156, 148, 160, 902, 905, 930

(56) References Cited

U.S. PATENT DOCUMENTS

| | | | | |
|---|---|---|---|---|
| 4,972,035 A | * | 11/1990 | Suga et al. | 526/125 |
| 5,143,549 A | * | 9/1992 | Howard, Jr. | 106/499 |
| 5,376,611 A | * | 12/1994 | Shveima | 502/84 |
| 5,883,173 A | * | 3/1999 | Elspass et al. | 524/446 |
| 5,973,084 A | * | 10/1999 | Suga et al. | 526/129 |

* cited by examiner

*Primary Examiner*—Edward J. Cain

(57) ABSTRACT

The present invention is a nanocomposite which is a dispersion of nanofiller particles derived from layered metal oxides or metal oxide salts. The nanocomposite is advantageously prepared by first swelling an untreated clay in water, then removing the water to form an organophilic clay that is dispersible in non-polar organic solvents. The organophilic clay can then be treated with an alkyl aluminoxane and subsequently a catalyst to form a complex that promotes olefin or styrenic polymerization and platelet dispersion. The nanocomposite can be prepared directly by in situ polymerization of the olefin or the styrene at the nanofiller particles without shear, without an ion exchange step, and without the need to incorporate polar substituents into the polyolefin or polystyrene.

15 Claims, No Drawings

POLYOLEFIN NANOCOMPOSITES

CROSS-REFERENCE STATEMENT

This application claims the benefit of a U.S. Provisional Application No. 60/078,085 Mar. 16, 1998, now abandoned.

This application is under a Government contract with the National Institute of Standards and Technology, Government Contract #70NANB7H3028.

This invention relates to a dispersion of platelet particles in a polyolefin matrix, in particular, a dispersion prepared by in situ polymerization of the polyolefin.

Nanocomposites, which are dispersions of particles having at least one dimension that is less than 20 nm in a continuous polymer matrix, confer physical property enhancement to the polymer at a much lower particle content than conventional filled glass- or mineral-reinforced polymers. Nanocomposite materials are described in U.S. Pat. Nos. 4,739,007; 4,618,528; 4,528,235; 4,874,728; 4,889,885; 4,810,734; 5,385,776; and 5,578,672; and in WO 93/11190.

Conventionally, these nanocomposites can be synthesized in a two-step process. In the first step, a clay or layered silicate is modified, generally by ion exchange of alkali metal or alkaline earth metal ions (which exist in natural forms of mica-type silicates) with organic cations such as alkyl ammonium silicates or suitably functionalized organosilanes. This modification step renders the normally hydrophilic mica-type silicate organophilic; the concomitant increase in the interlayer spacing between adjacent silicate layers enhances the dispersibility of the modified particles in a polymer matrix. In a second step, a melt-processible polymer and the organophilic particles are compatibilized under high shear to form a polymer with enhanced physical properties. Alternatively, a polymer that is generated in situ can react with functionalized groups in the organophilic particles.

Generally, relatively non-polar polymers such as polyolefins need to be copolymerized or grafted with a polar substituent such as maleic anhydride to facilitate the exfoliation of the multi-layered particles. (See *Macromolecules*, Vol. 30, p. 6333 (1997).) Without such modifications, the resultant composite will not have enhanced physical properties.

Composites of modified clays in polar-substituted polyolefins as described in the prior art suffer from a number of disadvantages. First, the ion exchange step is costly, time-consuming, and may introduce chemistries that degrade the physical properties of the final composite. Second, the modification of the polymer adds undesirable cost and may produce a more degradable polyolefin by virtue of the addition of oxygen to the polymer. Third, the use of high shear can cause undesirable polymer degradation.

In view of these disadvantages, it would be desirable to prepare polyolefin or polystyrene nanocomposites that do not require pretreatment of the clay or modification of the polymer or high shear processing.

The present invention addresses the aforementioned disadvantages by providing a nanocomposite comprising an in situ prepared polyolefin having dispersed therein nanofiller particles derived from metal layered oxides or metal oxide salts.

In a second aspect, the present invention is a method of preparing a nanocomposite comprising the steps of:

a) dispersing a hydrophilic clay into water to swell the clay;

b) removing the water from the swelled clay to produce an organophilic clay;

c) contacting the organophilic clay with an alkyl aluminoxane in the presence of an inert solvent for the organophilic clay and the alkyl aluminoxane to form a clay/alkyl aluminoxane complex;

d) contacting the complex with a catalyst that promotes olefin polymerization to form a clay/methyl aluminoxane/catalyst complex; and e) contacting the complex of step (d) with an olefin or a styrene monomer under polymerization conditions to form the nanocomposite.

In a third aspect, the present invention is a method of preparing a nanocomposite which comprises the steps of:

a) dispersing a hydrophilic smectite clay into water to swell the clay;

b) removing the water from the swelled clay by freeze-drying to produce an organophilic clay;

c) contacting the freeze-dried organophilic clay with an excess of methyl aluminoxane in the presence of an inert solvent for the organophilic clay and the methyl aluminoxane to form a clay/methyl aluminoxane complex;

d) removing the solvent and excess methyl aluminoxane from the complex;

e) contacting the complex of step (d) with a metallocene or Ziegler-Natta catalyst in the presence of a non-polar inert solvent to make a clay/methyl aluminoxane/catalyst complex; and f) contacting the complex of step (e) with a ethylene or propylene under polymerization conditions to form the nanocomposite.

The present invention provides a way of preparing a polyolefin nanocomposite with enhanced physical properties that does not require either an ion exchange step or a polar group modified polymer. Moreover, the polyolefin nanocomposite can be prepared in the absence of shear.

The polyolefin nanocomposite of the present invention is advantageously prepared by first dispersing the multi-layered particles into water under such conditions to swell the particles. These multi-layered particles are preferably smectite clays such as montmorillonite, hectorite, saponite, sauconite, and vermiculite, or layered silicates such as magadiite and kenyaite. Other useful multi-layered particles include illite minerals and layered aluminum or zirconium phosphates, as well as admixtures of the above-mentioned multi-layered particles.

The hydrophilic multi-layered particles are rendered organophilic by first swelling the particles in water, preferably hot deionized water, to form a gel-like slurry. It may be desirable to centrifuge or decant the slurry and discard any precipitate that is formed before water is removed from the slurry.

Water may be removed, for example, by freeze-drying, distillation under reduced pressure, or distillation at ambient pressure, or a combination of these methods. The dehydrated multi-layered material is then advantageously dispersed in a non-polar inert solvent such as pentane, hexane, heptane, octane, and toluene, preferably at a concentration of less than 10 weight percent based on the weight of the solvent and the treated clay.

An alkyl aluminoxane, preferably methyl aluminoxane (MAO), is then mixed with the dispersion of the dehydrated clay, generally as a substantially water-free solution in a non-polar inert solvent to form a MAO/treated clay complex. MAO is preferably added in stoichiometric excess with respect to MAO-active sites in the dehydrated clay. Inasmuch as it is desirable to remove any unreacted MAO, the solution is preferably stripped of solvent and the resultant solid is preferably washed with a solvent for the MAO such as toluene or xylene, to remove substantially all of the unreacted MAO. As used herein, the term "unreacted MAO" refers to the MAO that can be removed from the solid complex by solvent washing.

The MAO/dehydrated clay complex that is substantially free of unreacted MAO is advantageously redispersed in a solvent along with a catalyst that promotes polymerization of α-olefins or styrenes. Such catalysts include Ziegler-Natta catalysts and monocyclopentadienyl complexes biscyclopentadienyl complexes, ansa-metallocenes, and indenyl-fluorenyl substituted metallocenes such as those well known in the art. (See U.S. Pat. Nos. 3,645,922; 5,064,802; 5,374,696, and 5,470,993.) The MAO/dehydrated clay complex/catalyst dispersion is then contacted with an a-olefin, an a,o-diolefin, a non-conjugated a-internal double bond diolefin, or a styrene monomer under polymerization conditions to form a polyolefin or a polystyrene nanocomposite. Examples of suitable monomers and/or comonomers include ethylene, propylene, 1-butene, 4-methyl-1-pentene, 1-hexene, 1-octene, 1-decene, styrene, ethylene-propylenediene monomer, 1,4-hexadiene, 1,5-hexadiene, 1,7-octadiene, 1,9-decadiene, dicyclopentadiene, ethylidene norbornene, and combinations thereof. The composite contains dispersed nanofiller particles within a polymer matrix.

The polyolefin is preferably substantially free of polar substituents, and more preferably contains no polar substituents. As used herein, the term "polar substituent" refers to any substituent that increases the polarity of the polyolefin or polystyrene. Examples of such substituents include carboxylic acid groups, anhydride groups, silyl groups, and hydroxy groups. As used herein, the term "substantial absence" refers to less than about 1 percent, more preferably less than about 0.1 percent, and most preferably less than about 0.01 percent, based on the weight of the polymer.

The concentration of the dispersed particles in the polymer matrix is preferably not greater than about 10 percent, more preferably not greater than about 5 percent by volume, and preferably not less than about 0.5 percent, more preferably not less than about 1 percent by volume.

The polyolefin nanocomposite of the present invention has improved properties such as yield stress or stress at break over conventional polyolefins. Such improvements result in a composite material that can be used to make molded parts.

The following examples are for illustrative purposes only and is not intended to limit the scope of this invention.

EXAMPLE 1

Montmorillonite (40 g, Crook County, Wyo. USA) and deionized water (1 liter) were stirred together in a flask at 80° C. for 2 hours. The resultant gel-like slurry was centrifuged for 30 minutes at 2000 rpm. A precipitate that formed during centrifugation was discarded, and the filtrate was split into two 1-liter flasks, both of which were placed into a Laboonco Freeze-dryer B (Labconco Corporaton, Kansas City, Mo.) to remove water under vacuum. After removal of water from the frozen filtrate, a fluffy white solid was obtained.

A portion of this resulting solid (2.5) was further degassed at 105° C. under vacuum overnight. The degassed solid was dispersed in 300 mL of freshly distilled and dried heptane under agitation and without exposure to air. A solution of MAO in toluene (Witco, Corporation, 25 mL of a 1.65 M solution) was placed in a flask and heated to 50° C. to evaporate the toluene and the residual trimethylaluminum. The resultant dry MAO was redissolved in 25 mL of freshly dried toluene. The MAO solution was transferred to the freeze-dried olay/heptane slurry with stirring at 50° C. Heating continued for 1 hour, whereupon the solvent was removed under vacuum at 50° C. The resultant powder was heated to ISOC for 2 hours, then cooled to room temperature. The powder was washed three times with freshly dried toluene (3×150 mL at 80° C.) to remove excess MAO, and dispersed with stirring in freshly dried heptane (250 mL).

A portion of the MAO/dehydrated clay/heptane slurry (100 mL) was transferred into a 200-mL round-bottom flask and heated to 80° C. with stirring. Then, the catalyst (t-butylamido) dimethyl (tetram ethyl-$\eta^5$-cyclopentadienyl) silanetitanium dimethyl (The Dow Chemical Company, 1 mL of $4.55 \times 10^{-3}$ M in heptane) was added to the slurry to form a yellowish slurry (presumably an activated clay catalyst slurry). The slurry was aged at 80° C. for 1 hour, then transferred to a flame-dried 200-mL round-bottom flask for ethylene polymerization.

Ethylene was added to the activated clay catalyst slurry at 70° C. and a pressure of 172 kPa (1.7 atmospheres or 25 pounds per square inch gauge). The consumption of ethylene was monitored using a thermal conductivity flow meter. During the course of polymerization, the polymer-loaded clay particles were well dispersed in the reaction solvent, and no composite settlement was observed. Removal of solvent after 6 hours of reaction resulted in 35 g of polyethylene-clay filler composite, which was a free-flowing powder. This powder was compressed into a disc and then into a film that was transparent to visible light. A Scanning Transmission Electron Microscopy image of the clay filled composite showed nanoscale clay particles uniformly dispersed in the polyethylene matrix.

EXAMPLE 2

The procedure of Example 1 is repeated but with the myriad of variations as set forth in Table I.

TABLE I

| Sample | Filler | State | Mass of filler[a] (g) | MAO $10^{-3}$ mole | Catalyst $10^{-6}$ mole | Al/Ti initial ratio | Filler loading (wt %) |
|---|---|---|---|---|---|---|---|
| LD-21 | ma | uncalcined | 0.5 | 8.25 | 2.6 | 3170 | — |
| LD-22 | ma | uncalcined | 0.5 | 8.25 | 5.21 | 1580 | — |

TABLE I-continued

| Sample | Filler | State | Mass of filler[a] (g) | MAO $10^{-3}$ mole | Catalyst $10^{-6}$ mole | Al/Ti initial ratio | Filler loading (wt %) |
|---|---|---|---|---|---|---|---|
| LD-23 | mo | calcined | 0.5 | 8.25 | 2.6 | 3170 | — |
| LD-25 | none | — | — | 24.75 | 15.63 | 1580 | 0 |
| LD-26 | h | uncalcined | 3 | 33 | 15.63 | 2110 | 4.2 |
| LD-27 | mo | uncalcined | 2.44 | 27.22 | 12.5 | 2180 | 3.3 |
| LD-29 | h | uncalcined | 2.55 | 19.8 | 13.66 | 1450 | 3.8 |
| LD-31 | h | uncalcined | 2.55 | 19.8 | 13.66 | 1450 | 4.0 |
| LD-32 | mo | uncalcined | 2.55 | 19.8 | 13.66 | 1450 | 3.9 |
| LD-33 | mo | uncalcined | 2.55 | 19.8 | 13.66 | 1450 | 4.1 |
| LD-34 | h | uncalcined | 2 | 15.5 | 10.63 | 1450 | 18.2 |
| LD-35 | k | calcined | 3.05 | 23.76 | 16.19 | 1470 | 2.3 |
| LD-36 | h | uncalcined | 3.06 | 23.76 | 16.19 | 1470 | 3.4 |
| LD-36A | h | uncalcined | 3.06 | 23.76 | 16.19 | 1470 | — |
| LD-36B | h | uncalcined | 3.06 | 23.76 | 16.19 | 1470 | — |
| LD-36C | h | uncalcined | 3.06 | 23.76 | 30.75 | 770 | 4.5 |
| LD-36D | h | uncalcined | 3.06 | 23.76 | 30.75 | 770 | 13.0 |
| LD-36E | h | uncalcined | 3.06 | 23.76 | 30.75 | 770 | 2.8 |
| LD-36F | h | uncalcined | 3.06 | 33 | 30.75 | 1075 | 11.4 |
| LD-37 | ma1 | uncalcined | 3.06 | 23.76 | 30.75 | 770 | 4.6 |
| LD-38 | ma2 | uncalcined | 3.06 | 16.5 | 30.75 | 535 | — | k = kaolin, h = hectorite, mo = montmorillonite, ma = magadiite (first lot), ma1 = magadiite (Na$^+$H$^+$), ma2 = magadiite (H$^+$)
a) initial weight before drying 0.3 bar H$_2$ added during polymerization of Samples LD-36 to LD-38

It should be noted that Sample LD-35 is a "microcomposite" and not, strictly speaking, a "nanocomposite". It should also be noted that Sample LD-25 is not a "nanocomposite" but instead is a control, i.e., no filler added. Hydrogen is added during the polymerization of Samples LD-36 to LD-38. Such addition of hydrogen reduces the molecular weight of the polymer by chain transfer, i.e., hydrogen is a chain transfer agent and in the broad aspect of the instant invention, any suitable chain transfer agent can be used. Table II lists the activity of the catalyst in the polymerization for most of the Samples of Table I, which activity is expressed in terms of kilograms of polymer produced per gram of catalyst used.

TABLE II

| Nanocomposite | Activity | Nanocomposite | Activity |
|---|---|---|---|
| LD 25 (HDPE) | 50 | LD 35 (kaolin) | 89 |
| LD 26 (hectorite) | 5.19 | LD 36 (hectorite) | 49.4 |
| LD 27 (mont.) | 164.7 | LD 36C (hectorite) | 40.9 |
| LD 29 (hectorite) | 129.5 | LD 36D (hectorite) | 21.6 |
| LD 31 (hectorite) | 108.0 | LD 36E (hectorite) | 56.9 |
| LD 32 (mont.) | 178.0 | LD 36F (hectorite) | <7.4 |
| LD 33 (mont.) | 102.4 | LD 37 (magadiite Na$^+$/H$^+$) | 145.3 |

Table III lists various tensile testing for many of the Samples of Table I at a strain rate of 1.25 per minute. The data in Table III show that the Samples polymerized with the addition of hydrogen have a surprising combination of both high modulus and high strain at break.

TABLE III

| | | Young's Modulus (MPa) | % Strain at break | Stress at Yield (kPa) | Stress at break (kPa) |
|---|---|---|---|---|---|
| LD-25 | | 960 | 496 | 21000 | 27200 |
| | Std. Dev. | 130 | 138 | 1530 | 5500 |
| LD-26 | | 620 | 228 | (no yield) | 36400 |
| | Std. Dev. | 3.7 | 16 | | 3000 |
| LD-27 | | 645 | 231 | (no yield) | 36500 |
| | Std. Dev. | 56 | 24 | | 3535 |
| LD-29 | | 910 | 287 | (no yield) | 49264 |
| | Std. Dev. | 74 | 26 | | 3569 |
| LD-31 | | 930 | 263 | (no yield) | 47507 |
| | Std. Dev. | 100 | 55 | | 6931 |
| LD-32 | | 590 | 284 | (no yield) | 48347 |
| | Std. Dev. | 290 | 14 | | 24652 |
| LD-33 | | 770 | 227 | (no yield) | 46680 |
| | Std. Dev. | 45 | 19 | | 1709 |
| LD-35 | | 590 | 353 | (no yield) | 58124 |
| | Std. Dev. | 35 | 34 | | 6070 |
| LD-36 | | 2520 | 684 | 29800 | 39328 |
| | Std. Dev. | 195 | 94 | 283 | 8626 |
| LD-36C | | 1800 | 697 | 26451 | 44565 |
| | Std. Dev. | 160 | 10 | 634 | 1288 |
| LD-36C (repeat) | | 1600 | 658 | 26000 | 39053 |
| | Std. Dev. | 320 | 41 | 517 | 5891 |

What is claimed is:
1. A nanocomposite produced by the method comprising steps of:
    (a) dispersing a hydrophilic clay into water to swell the clay;
    (b) removing the water from the swelled clay to produce on organophilic clay;
    (c) contacting the organophilic clay with an alkyl aluminoxane in the presence of an inert solvent for the organophilic clay and the alkyl aluminoxane to form a clay/alkyl aluminoxane complex;
    (d) contacting the complex with a catalyst that promotes olefin polymerization to form a clay/alkyl aluminoxane/catalyst complex; and
contacting the complex of step (d) with an olefin monomer under polymerization conditions to form the nanocomposite, wherein the volume percent of nanofiller particles dispersed in the nanocomposite is in the range of 1 to 10 percent.
2. The nanocomposite of claim 1 wherein the polyolefin is a polymer of ethylene, propylene, 1-pentene, 1-butene, 4-methyl-1-pentene, 1-hexene, 1-octene, 1-decane, styrene, ethylidene norbornene, 1,4-hexadiene, 1,5-hexadiene, 1,7-octadiene, 1,9-decadiene, dicyclopentadiene or copolymers thereof.
3. The nanocomposite of claim 1 wherein the polyolefin is a polymer of ethylene or propylene, and wherein the volume percent of nanofiller particles dispersed in the ethylene or the propylene is in the range of 1 to 10 percent.
4. A method of preparing a nanocomposite comprising the steps of:
    (e) dispersing a hydrophilic clay into water to swell the clay;
    (f) removing the water from the swelled clay to produce an organophilic clay;
    (g) contacting the organophilic clay with an alkyl aluminoxane in the presence of an inert solvent for the organophilic clay and the alkyl aluminoxane to form a clay/alkyl aluminoxane complex;
    (h) contacting the complex with a catalyst that promotes olefin polymerization to form a clay/alkyl aluminoxane/catalyst complex; and
    (i) contacting the complex of step (d) with an olefin monomer under polymerization conditions to form the nanocomposite, wherein the volume percent of nanofiller particles dispersed in the nanocomposite is in the range of 1 to 10 percent.

5. The method of claim 4 wherein the clay is sodium montmorillonite, laponite, or hectorite.

6. The method of claim 5 wherein water is removed by freeze-drying.

7. The method of claim 6 wherein the catalyst is a Ziegler-Natta catalyst or a metallocene catalyst.

8. A method of preparing a nanocomposite comprising the steps of:
   a) dispersing a hydrophilic smectite clay containing alkali metal or alkaline earth metal cations into water to swell the clay;
   b) removing the water from the swelled clay by freeze-drying to produce an organophilic clay;
   c) contacting the freeze-dried organophilic clay with an excess of methyl aluminoxane in the presence of an, inert solvent for the organophilic clay and the methyl aluminoxane to form a clay/methyl aluminoxane complex.
   d) removing the solvent and excess methyl aluminoxane from the complex;
   e) contacting the complex of step (d) with a metallocene or Ziegler-Natta catalyst in the presence of a non-polar inert solvent to make a clay/methyl aluminoxane/catalyst complex; and contacting the complex step (e) with ehtylene or propylene under polymerization conditions to form the nanocomposite, wherein the volume percent of nanofiller particles dispersed in the nanocomposite is in the range of 1 to 10 percent.

9. The method of claim 8 wherein the smectite clay is sodium montmorillonite.

10. The method of claim 4 further including adding a chain transfer agent during step (e).

11. The method of claim 10 where the chain transfer agent is hydrogen.

12. The method of claim 8 further including adding a chain transfer agent during step (f).

13. The method of claim 12 where the chain transfer agent is hydrogen.

14. The nanocomposite of claim 1 wherein the percent strain at break is greater than five hundred percent and the tensile modulus is greater than one thousand five hundred MPa.

15. The nanocomposite of claim 1 wherein the percent strain at break is greater than six hundred percent and the tensile modulus is greater than one thousand eight hundred MPa.

* * * * *